Patented Mar. 21, 1933

1,902,684

UNITED STATES PATENT OFFICE

ERICH ASSER, OF WANDSBEK, GERMANY

METHOD OF TREATING DRYING OILS

No Drawing. Application filed November 2, 1929, Serial No. 404,513, and in Germany May 1, 1929.

This invention relates to improvements in the method of treating drying oils and their application in preparing paints, varnishes and the like, and more especially to an improved method of treating linseed oil and kindred oils for the purposes set forth.

A known method of thickening linseed oil and other oils having substantial drying properties consists in blowing air through the oil while the latter is heated up to a temperature of about 120 centigrade, polymerization of the oil taking place during the heating process.

Linseed oil thus thickened and being known also as linoxyn—is exclusively used for making linoleum but was not fit for other purposes. In contradistinction thereto it has been found that novel substances having very valuable properties can be obtained from linseed oil and kindred oils by subjecting them to the treatment according to this invention.

The nature and scope of this invention are briefly outlined in the appended claims and will be more fully understood by the following specification:

The oil is first heated until polymerization begins to set in and the oil begins to thicken; from this moment air is blown through the oil while the heating of the latter is continued up to about 310 centigrade.

Care must be taken to prevent the vapors emanating from the heated oil from catching fire and provision should be made e. g. for supplying carbonic acid to the heating apparatus which on spreading out over the surface of the oil, will extinguish any flame in statu nascendi.

In addition thereto mechanical means or contrivances may be used to advantage by which the heating pan can be readily emptied and cooled in the event of vapors issuing from the oil catching fire, whereafter the withdrawn oil may be returned into the cooled pan and the heating and blowing process may be continued until the oil is converted into the desired substance having those valuable properties referred to hereinafter.

By the treatment described above within a comparatively short period of time thickened linseed oil is obtained which substantially differs in its properties from common standoil obtained by slowly boiling and heating the crude oil up to the about 300 centigrade, but in the absence of air blown through the latter.

The thickened oil obtained in the manner described by heating and blowing air through the crude oil solidifies very rapidly on being exposed to the air; it can be widely used to advantage in the painters' and allied trades e. g. for the preparation of varnishes and of standoils, for the production of printer's ink, of linoxyn as used in the manufacture of linoleum, of plastic masses as used for packing purposes, for sealing joints and in copying apparatus etc.

Extended experiments have shown that the process of treating oil by heating and blowing air through it as described may be modified in such manner that thickened oil having any desired degree of viscosity is obtained.

By reason of the thickened oil tending to dry very rapidly it can be dissolved to advantage in benzene as used for production of varnishes, or in oil of turpentine or the like, whereby compounds very suitable for coating surfaces are obtained.

A great many coats of said solutions may be applied in quick succession to the surface concerned, viz. a fresh layer may be put on top of its predecessor before the latter is thoroughly dried, in as much as this procedure has proved not to interfere with the proper thorough and uniform drying of the whole number of layers, but to ensure their intimate contact, fusion and binding.

In contradistinction to common thin liquid linseed varnishes often tending to drip off and run down on the coated surface this dripping off is not likely to occur with varnishes obtained by the improved method of preparation set forth hereinbefore.

Various changes and modifications may be made in carrying out the above described method of thickening linseed oil and kindred oils without substantially deviating from the spirit and the salient ideas of the invention and sacrificing any advantages obtained thereby.

E. g. drying substances, resins, and oils may be added to the oil under treatment before or after air has been blown through it, solvents, of course, must be added after the air blowing operations; oil varnishes and dry paints may be made from the thickened product, e. g. the latter may be mixed with cellulose esters or cellulose ethers and may be readily used in combination with those admixtures. A great many different substances useful in the painting trade may thus be obtained such as spatula, groundwork paints, oil colors, enamel varnishes, compound varnishes, rust preventing paints, impregnating substances etc.

Blown linseed oil thickened in the manner described or other quick drying oils may be used to advantage for making linoxyn by coating a suitable fabric such as canvas with the oil concerned and subjecting the coated fabric to the oxidizing action of the air. As the result of the preliminary treatment of the oil, layers of oil of considerably greater thickness can be applied to the fabric than with common linseed oil which has not been previously boiled and blown, and the production of linoxyn is thus accomplished in a considerably shorter period of time than it was possible heretofore.

A typical case (Nr. 1) illustrating the method of carrying out this invention in practice is: Heating linseed oil up to a temperature of about 280 centigrade, then blowing air—which is preferably previously heated,—through the oil and continuing to heat the latter up to 310 centigrade. It will then be found that after the elapse of about two hours the thickened oil has the viscosity of normal standoil.

A modified treatment consists in first adding 100 parts of 0.5% cobalt oxyhydrate and 0.2% acetate of lead to the oil and carrying on the heating up to 280 centigrade; linseed oil may be mixed with 10% ester resins and subsequently heated up to 280 centigrade; other suitable admixtures comprise 20 parts of wood-oil or 25 parts sunflower oil, respectively, mixed with 100 parts linseed oil.

From this compound, thickened according to this invention, a coating substance of a consistency appropriate for being readily spread out may be obtained by dissolving the compound in benzene.

Another typical prescription (Nr. 2) for preparing a paint comprises: kneading together 60 parts of white lead, 25 parts of linseed oil previously blown and heated up to 310 centigrade, 15 parts of white spirit and 3 parts of drier and thereafter grinding the mixture in a mill.

Another typical prescription (Nr. 3) comprises: dissolving linseed oil previously blown and heated up to 310 centigrade in 10 parts of butyl acetate and adding to the solution 10 parts of collodion of low viscosity, 10 parts of resin esters, 10 parts of butyl acetate, 15 parts of butyl alcohol, 20 parts of acetic acid esters and 20 parts of toluol.

I claim:—

1. Improved method of treating drying oils for paint purposes, which comprises heating the oil to a temperature at which polymerization begins until the oil begins to thicken, then blowing air through the oil and continuing to heat the latter up to about 310° C, until the viscosity of standoil is obtained.

2. Improved method of treating linseed oil, which comprises heating the oil for paint purposes to a temperature below at which polymerization begins until the oil begins to thicken, then blowing air through the oil and continuing to heat the latter up to about 310° C., until normal standoil is obtained.

3. Improved method of preparing quick drying coating substances for paint purposes to be made of linseed oil which comprises heating the linseed oil to a temperature below at which polymerization begins until the oil begins to thicken, then blowing air through the oil and continuing to heat the latter up to about 310° C., until normal standoil is obtained.

4. Improved method of preparing quick drying coating substances from linseed oil for paint purposes, which comprises mixing the linseed oil with other oils, heating the mixture until the mixture begins to thicken and then heating it to about 310° C., while blowing air through the mixture.

5. Improved method of preparing quick drying coating substances from linseed oil for paint purposes, which comprises heating the oil until it begins to thicken, then blowing air through the oil while heating it to about 310° C., and mixing the product thus obtained with driers.

6. Improved method of preparing quick drying coating substances for paint purposes from linseed oil, which comprises heating the oil until it begins to thicken, then blowing air through the oil while heating it to about 310° C., and mixing the product thus obtained with pigments.

7. Improved method of preparing quick drying coating substances for paint purposes from linseed oil, which comprises heating the oil until it begins to thicken then blowing air through the oil while heating it to about 310° C., and mixing the product thus obtained with cellulose compounds.

In testimony whereof I affix my signature.

ERICH ASSER.